United States Patent
Shih

(10) Patent No.: US 7,509,503 B2
(45) Date of Patent: Mar. 24, 2009

(54) METHOD OF N-DIVISION ALGORITHM FOR SWITCHING OPERATION VOLTAGE OF CPU

(75) Inventor: Tung-Ho Shih, Taipei (TW)

(73) Assignee: Via Technologies, Inc., Taipei (TW)

( * ) Notice: Subject to any disclaimer, the term of this patent is extended or adjusted under 35 U.S.C. 154(b) by 1524 days.

(21) Appl. No.: 10/358,240

(22) Filed: Feb. 5, 2003

(65) Prior Publication Data

US 2004/0039947 A1    Feb. 26, 2004

(30) Foreign Application Priority Data

Aug. 20, 2002    (TW) ............... 91118747 A

(51) Int. Cl.
*G06F 1/00* (2006.01)
*G06F 1/32* (2006.01)

(52) U.S. Cl. ............... 713/300; 713/320; 713/321

(58) Field of Classification Search ............ 713/300, 713/320, 321
See application file for complete search history.

(56) References Cited

U.S. PATENT DOCUMENTS

| 5,530,336 | A  | * | 6/1996 | Eguchi et al. ........... 320/118 |
| 6,433,521 | B1 | * | 8/2002 | Chen et al. ............. 323/224 |
| 6,766,460 | B1 | * | 7/2004 | Evoy et al. ............. 713/323 |
| 6,865,653 | B2 | * | 3/2005 | Zaccarin et al. ......... 711/154 |
| 6,906,579 | B2 | * | 6/2005 | Masleid et al. .......... 327/538 |

* cited by examiner

*Primary Examiner*—Thomas Lee
*Assistant Examiner*—Michael J Brown
(74) *Attorney, Agent, or Firm*—Rosenberg, Klein & Lee

(57) ABSTRACT

A method of N-division algorithm for switching operation voltage of CPU is provided. The method of N-division algorithm comprises the following steps, comparing desired operation voltage and original operation voltage of CPU to obtain a differential value for switching high and low potential level of operation voltage. Further, dividing the differential value by N times, and the N number is depending on tolerant variate of operation voltage of CPU and the differential value. Furthermore, having a unit by a tolerant variate of operation voltage of CPU for switching the original operation voltage of CPU further by the N times for adjusting operation voltage to desired one.

8 Claims, 3 Drawing Sheets

METHOD OF N-DIVISION ALGORITHM FOR SWITCHING OPERATION VOLTAGE OF CPU

BACKGROUND OF THE INVENTION

1. Field of the Invention

The present invention relates to a method of multi-potential level switching operation voltage of CPU power management, especially used in a N-divisions algorithm to switch CPU operation voltage for solving unstable system during the multi-potential level switching operation voltage of CPU.

2. Description of the Prior Art

In market, traditional computer system with multi-potential level switching operation voltage adopted CPU is according to real situation to switch both CPU operation voltage and working frequency for achieving stable job and electric energy saving. This technology is called CPU power management. When CPU is executing a lot of programs and in full loading, it switches higher CPU operation voltage and frequency. Otherwise, when CPU is executing few programs and not in heave loading, it switches to lower CPU operation voltage and frequency.

According to conventional CPU power management, switching CPU power management comprises a power supply to provide a steady voltage for voltage regulator, as show in FIG. 1. The voltage regulator 10 provides a steady voltage 12 via signal line of VCPU# to CPU. The specification of general IBM computers, especially notebook computers, the power management of CPU 12 switches to lower work voltage while the CPU 12 is standby and if the CPU is active within full loading switched to higher work voltage, so as to achieve electric energy saving. For achieving object as above, the CPU 12 inform the voltage regulator 10 via signal line of CPU_VID#, then the voltage regulator 10 provide the operation voltage what CPU 12 need by VCPU# signal line.

Besides, the working mode of voltage regulator 10 in normal computers, shall be designed to reset the system when the operation voltage value divergence or the system is unstable for stabilizing the circuit system. The voltage regulator 10 drop down POWER_GOOD# signal of south bridge chip 14 connecting the system while south bridge chip 14 received the POWER_GOOD# was dropped down, CPU_RESET# signal was dropped down, simultaneity, then the CPU 12 reset.

The prior known to switch CPU operation voltage in CPU power management not asked voltage regulator 10 to reset the system is controlled by hardware. In circuit design, for solving the problem of voltage regulator 16 rests not only upgrades the specification of voltage regulator for supporting IMVP (Intel Mobile Voltage Positioning) and also has to install a GCL controller 18 between CPU and voltage regulator with IMVP additionally for stable the system. Referring to FIG. 2, while CPU_VID# signal of CPU 12 switching to higher voltage, CPU informs to IMVP voltage regulator 16 by the CPU_VID# signal line and voltage regulator 16 provides a stable voltage via Vgate# signal line to GCL controller 18. The GCL controller 18 informs to CPU 12 by POWER-GOOD_CPU# signal line that variable voltage is in normal switch range. If the CPU_VID# signal does not change, the IMVP voltage regulator 16 change huge means the power is out of order. It should be reset the CPU 12 by south bridge chip 14.

As above described prior technology is according to hardware device, the hardware device control the CPU has limited the usage and generated the extra cost. In PC market, cost is very important. Decreasing the number of ICs in use will be cost down and less IC chip layoff on circuit, furthermore decreasing the PC main board cost. Thereby, the present invention provides a method for switching the CPU operation voltage used in N-division algorithm by software to solve the problems as above described.

SUMMARY OF THE INVENTION

It is therefore an object of the invention to provide a method for switching CPU operation voltage used in a N-division algorithm for solving the problem of multi-potential level bring about unstable system during switching the operation voltage.

It is another object of this invention to provide software program about N-division algorithm for switching CPU operation voltage to solve the problem about unstable system. It also can save up the cost of hardware devices.

It is a further object of this invention to provide a method of N-division algorithm for switching CPU operation voltage. The process of N-division algorithm for switching CPU operation voltage can be controlled by software program, and the setting value or reference dates in process can be changeable easily.

To achieve these objects, and in accordance with the purpose of the invention, the invention provide a method of N-division algorithm for switching CPU operation voltage, the method comprises the following steps. First of all, comparing present operation voltage of CPU and desired operation voltage will be switched, and having a difference of operation voltage for switching high and low potential level. If the difference is in range of CPU can be tolerated, then dividing the difference into N segments.

BRIEF DESCRIPTION OF THE DRAWINGS

In order to understand the present invention, reference is made to the accompanying drawings. Understanding that these drawings are not to be considered limitations in the scope of the invention, the presently preferred embodiments and the presently understood best mode of the invention are described with additional detail through use of the accompanying drawings in which.

DETAIL DESCRIPTION OF THE PREFERRED EMBODIMENTS

Figure 1:
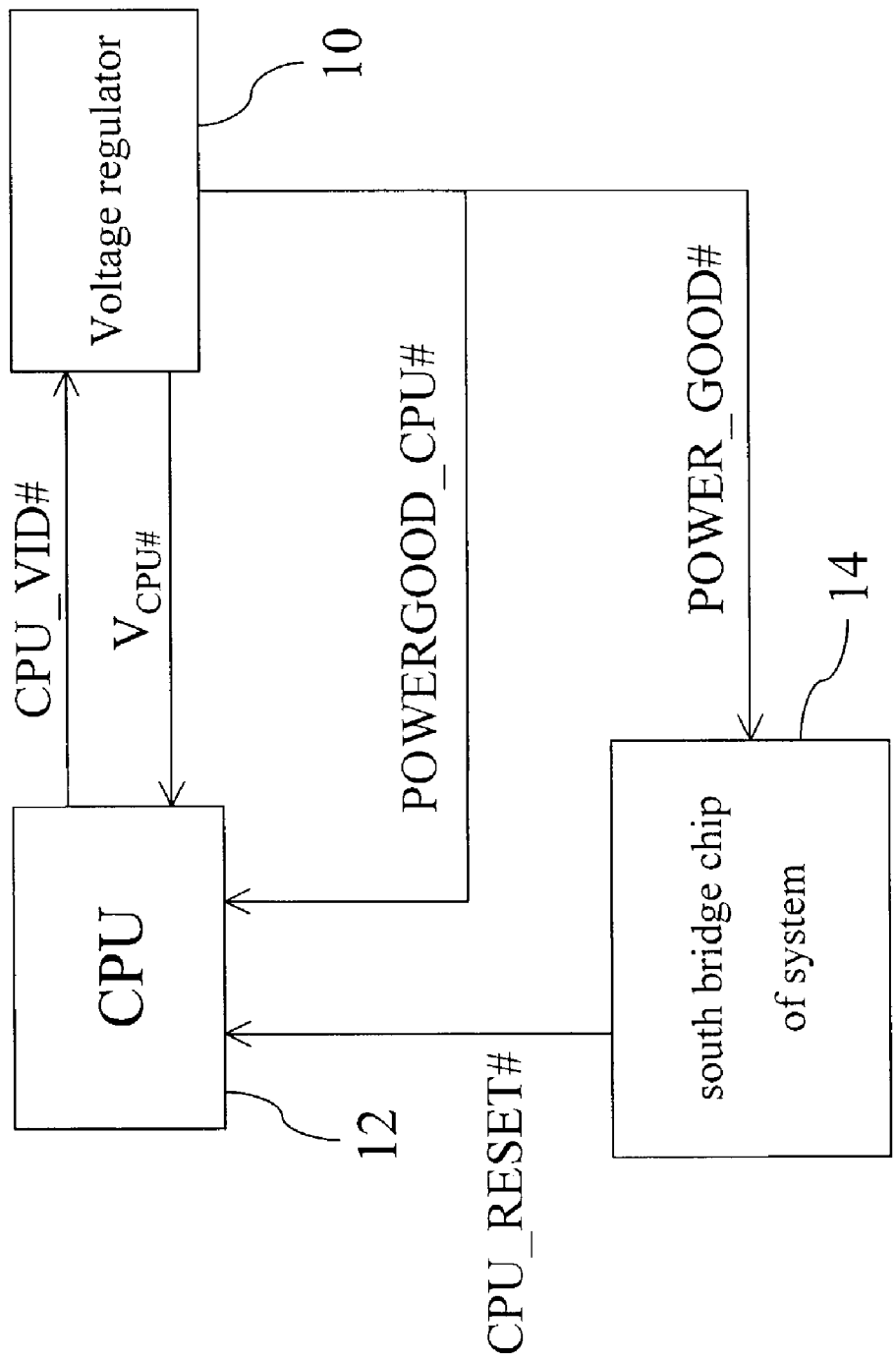
FIG. 1 illustrates a prior hardware for switching operation voltage of CPU power management.
Figure 2:
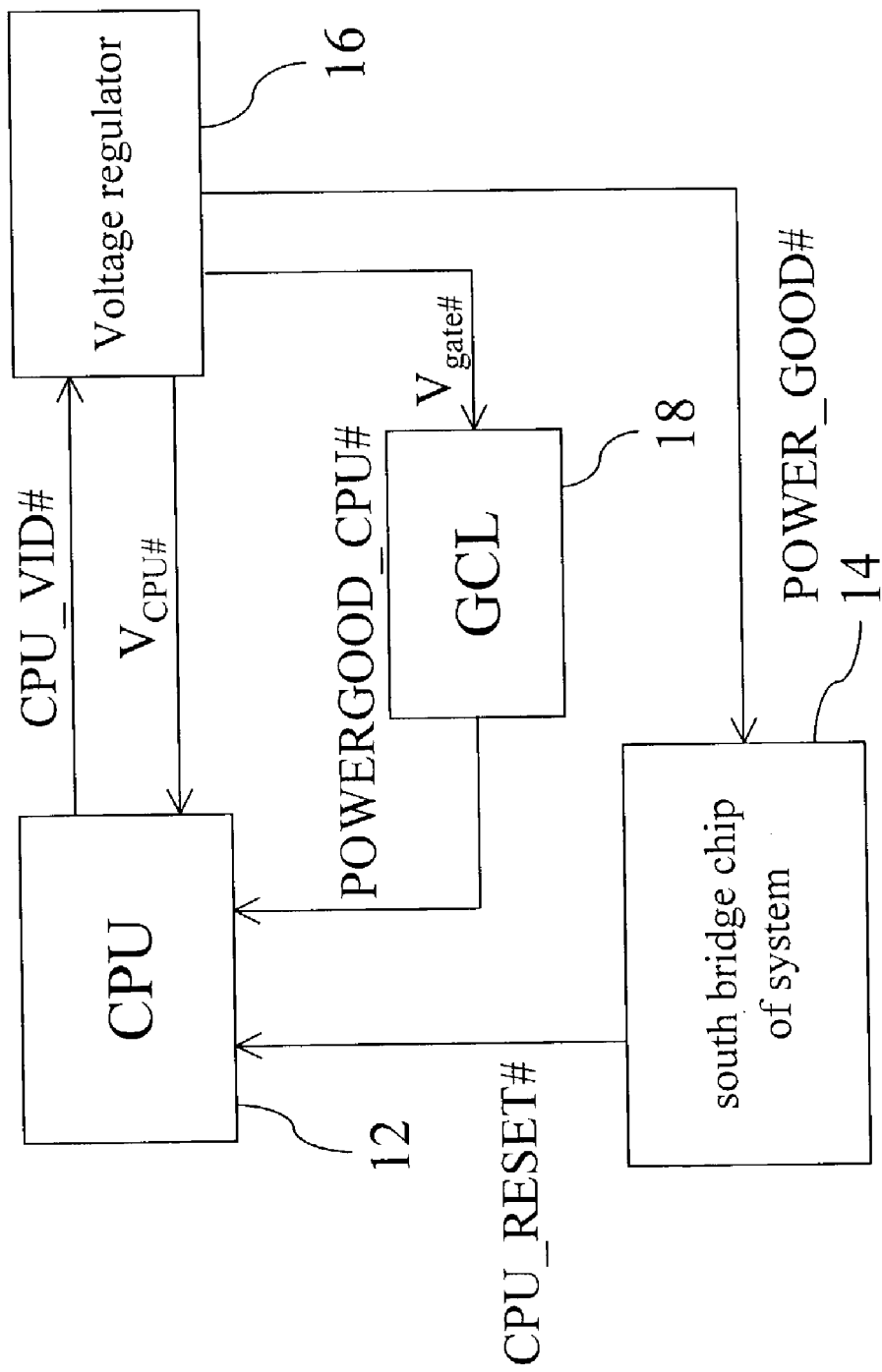
FIG. 2 illustrates a prior hardware for CPU power management with a voltage regulator.

The present invention provides a method of N-division algorithm for switching operation voltage and also can avoid the voltage regulator to recognize the difference which operation voltage switching to high or low potential level is too huge to identify the value is normal so as reset the system. In fact, switching the CPU operation voltage sometimes has a huge difference between high and low potential level, in prior technology used in hardware device to solve the huge difference, but in present invention used in N-division algorithm by software to switch the operation voltage. The method of N-division algorithm is switching the operation voltage by multipartite so as the CPU power management during switching the operation voltage will not in accordance with voltage regulator to rest the system.

In accordance with the present invention, the CPU switches the operation voltage, first at all; compare the present operation voltage and the operation voltage will be switched to of CPU, then a difference of operation voltage is gotten. Division the difference of operation voltage between high and low potential level into N segments based on the CPU tolerated variable value of operation voltage. Moreover, the difference of operation voltage of the CPU power management between high and low potential level is said CPU_Diff_Voltage, the tolerable variate of operation voltage of CPU also is the tolerable variate of voltage regulator said VCM_Diff_Voltage. The N is calculated from the difference of operation voltage of the CPU power management divide to tolerable variate of voltage regulator. Formulating the N as follows, and the N is integer, the remainder is R, then fine-tuning the voltage.

$$N=CPU\_Diff\_Voltage/VCM\_Diff\_Voltage$$

After the N value is calculated, the present operation voltage switches to desired operation voltage rely on N multi-potential level by the tolerable variate of voltage regulator in unit. If the N value from above formulating follows a remainder R, the operation voltages need to fine-tune until the operation voltage achieve to desired operation voltage.

In designing the CPU and main board, the tolerable variate of voltage regulator (VCM_Diff_voltage) will be estimated, so as the VCM_Diff_voltage in N-division algorithm is a constant, then take the VCM_Diff_voltage into formulation of N-division algorithm, and the N value is calculated. The N levels switching proceeded with the N-division algorithm, and ended in having an optimal operation voltage by the limitation loop algorithm. The switching order as follows: the lower operation voltage switches to higher operation voltage means a desired operation voltage of CPU will be higher then original operation voltage, so the operation voltage must be increased until the operation voltage is +N*VCM_Diff_Voltage, then fin-tuning R levels to the desired operation voltage. In other words, the higher operation voltage switches to lower operation voltage, the desired operation voltage of CPU will be lower then original operation voltage, so the operation voltage must be decreased until the operation voltage is −N*VCM_Diff_Voltage, then fin-tuning R levels to the desired operation voltage. The N levels for switching the operation voltage as above described is finished.

Figure 3:
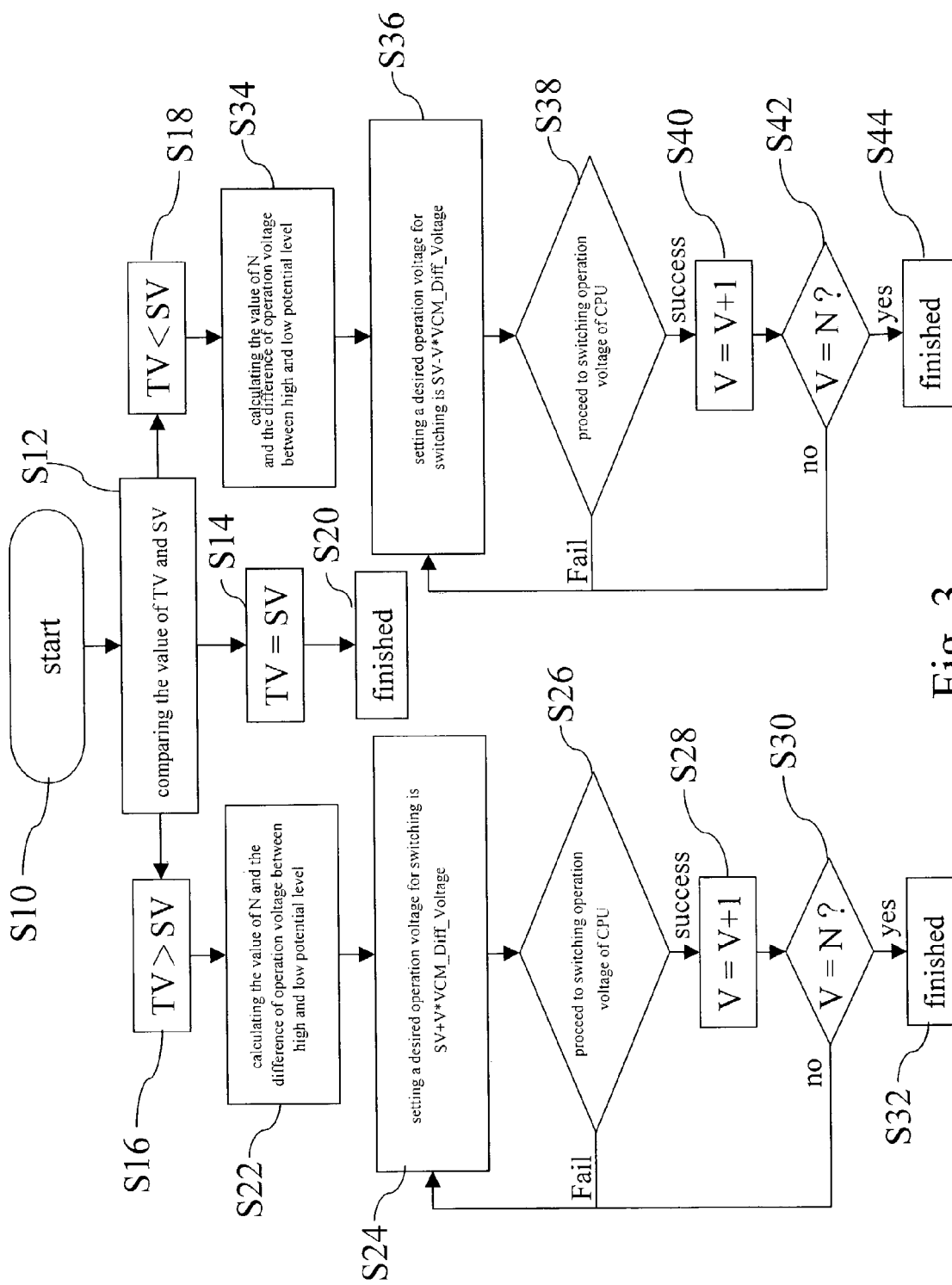
FIG. 3 illustrates flowcharts of embodiments of the present invention according to N-division algorithm for switching the CPU operation voltage.

Reference to FIG. 3 illustrates flowcharts of embodiments of the present invention used in N-division algorithm for switching the CPU operation voltage. The first step S10 of progress is starting to switch operation voltage. The second step S12 of progress is to compare the original operation voltage (eq. SV) and desired operation voltage (eq. TV). The result of above the TV equals SV is step S14, the TV greater then SV is step S16, and the TV smaller than SV is step S18.

Next to the step S16, the TV greater then SV, the process is going to step S22 calculate the switching variate of operation voltage between high and low potential level. The switching variate of operation voltage means SV subtracts from TV equal CPU_Diff_Votltage. The CPU_Diff_Votltage is divided by tolerated variate of voltage regulator of CPU equals N. The formulation is N=CPU_Diff_Votltage/VCM_Diff_Voltage; following the step S24 is to set the SV plus V*VCM_Diff_Voltage as the CPU operation voltage. The V is loop record variety, initial value equal to 1. Since we determine the CPU operation voltage, then we follow step S26 to switch CPU operation voltage. Each switching value is VCM_Diff_Voltage. If the progress of switching does not success, back to step S24 then repeat it. If it does work, proceed to step S28. The step S28 is plus 1 on V, and do logic operation S30. If V value is equal to N and then finish all. If value of V isn't equal to N, back to step S24, reset the CPU operation voltage and set a stronger operation voltage then before. Repeat and repeat again the steps, until the value of V is equal to N. And now, we have finished tried operation voltage switching procedure (S32).

After the step S18, the TV smaller then SV, the process gets into the step S34 calculating the switching variate of operation voltage between high and low potential level means for SV subtract from TV and have CPU_Diff_Votltage which is divided by tolerated variate of voltage regulator of CPU and obtain N. The formulation is N=CPU_Diff_Votltage/VCM_Diff_Voltage, following the step S36 is to set the V*VCM_Diff_Voltage subtracted from SV as the CPU operation voltage. V is loop record variety, initial value equal to 1. Since we determine the CPU operation voltage, then we follow step S38 to switch CPU operation voltage. And each switching value is VCM_Diff_Voltage. If we switch does not success, we back to step S36 and repeat it. If it does work, we proceed to step S40. The step S40 is V plus 1, and do logic operation S42. If V value is equal to N and then finish all. If value of V isn't equal to N, we back to step S36, reset the CPU operation voltage and set a stronger operation voltage then before. Repeat and repeat again the steps, until the value of V is equal to N. And now, we have finished tried operation voltage switching procedure (S44).

Foregoing, the present invention provides a method of N-division algorithm for switching operation voltage. The method of N-division algorithm for switching operation voltage is controlled by software so as the hardware is not necessary, the cost of hardware can be saved. Besides, the method of N-division algorithm for switching operation voltage will not be waste time. Further, the N-division algorithm is switched the operation voltage by unit, so the operation voltage is stable.

Furthermore, the present invention as above described provide the method of N-division algorithm for switching operation voltage can be solved the problem about unstable system undoubtedly.

The preferred embodiment is only used to illustrate the present invention; it is not intended to limit the scope thereof. Many modifications of the preferred embodiment can be made without departing from the spirit of the present invention.

What is claimed is:

1. A method of a N-division algorithm for adjusting and switching an operation voltage of a CPU, said method comprising the steps of:
   calculating a difference between a desired operation voltage and said operation voltage of said CPU to obtain a differential value for adjusting and switching said operation voltage;
   dividing said differential value by N, wherein said N is a number depending on a constant tolerance variation of said operation voltage of said CPU and said differential value; and
   regarding said constant tolerance variation of said operation voltage of said CPU as a pre-determined unit, and subsequently switching said operation voltage of said CPU by said N times for adjusting and switching said operation voltage to said desired operation voltage.

2. The method as claimed in claim 1, wherein said N is a positive integer, and said N equals said differential value divided by said constant tolerance variation of said operation voltage of CPU.

3. The method as claimed in claim 1, wherein said N has an integer part and a remainder part, R, and further includes the step of:

adjusting and switching said operation voltage for fine-tuning R levels when adjusting and switching said operation voltage by said N times until said operation voltage equals said desired operation voltage.

4. The method as claimed in claim 1, wherein when said operation voltage is greater than said desired operation voltage of CPU, further includes the steps of:

defining the pre-determined unit as said constant tolerance variation of said operation voltage of said CPU, and adjusting and switching said operation voltage by said N times and by decreasing said operation voltage to achieve said desired operation voltage, wherein a decreasing amount accomplished in one of said N times equals said constant tolerance variation.

5. The method as claimed in claim 1, wherein when said operation voltage is less than said desired operation voltage of said CPU, further includes the steps of:

defining the pre-determined unit as a constant tolerance variation of said operation voltage of said CPU, and adjusting and switching said operation voltage N times and by increasing said operation voltage to achieve said desired operation voltage, wherein an increasing amount accomplished in one of said N times equals said constant tolerance variation.

6. The method as claimed in claim 1, wherein when said operation voltage equals said desired operation voltage of said CPU, the progress of said method of said N-division algorithm is completed.

7. The method as claimed in claim 1, wherein said constant tolerance variation of said operation voltage of said CPU is a tolerance variation of an operation voltage of a voltage regulator.

8. The method as claimed in claim 1, wherein said constant tolerance variation of said operation voltage of said CPU is experimentally determined while designing and testing said CPU and a main board.

* * * * *